W. McCORD.
HAY AND COTTON PRESS.
No. 26,917.                                    Patented Jan. 24, 1860.
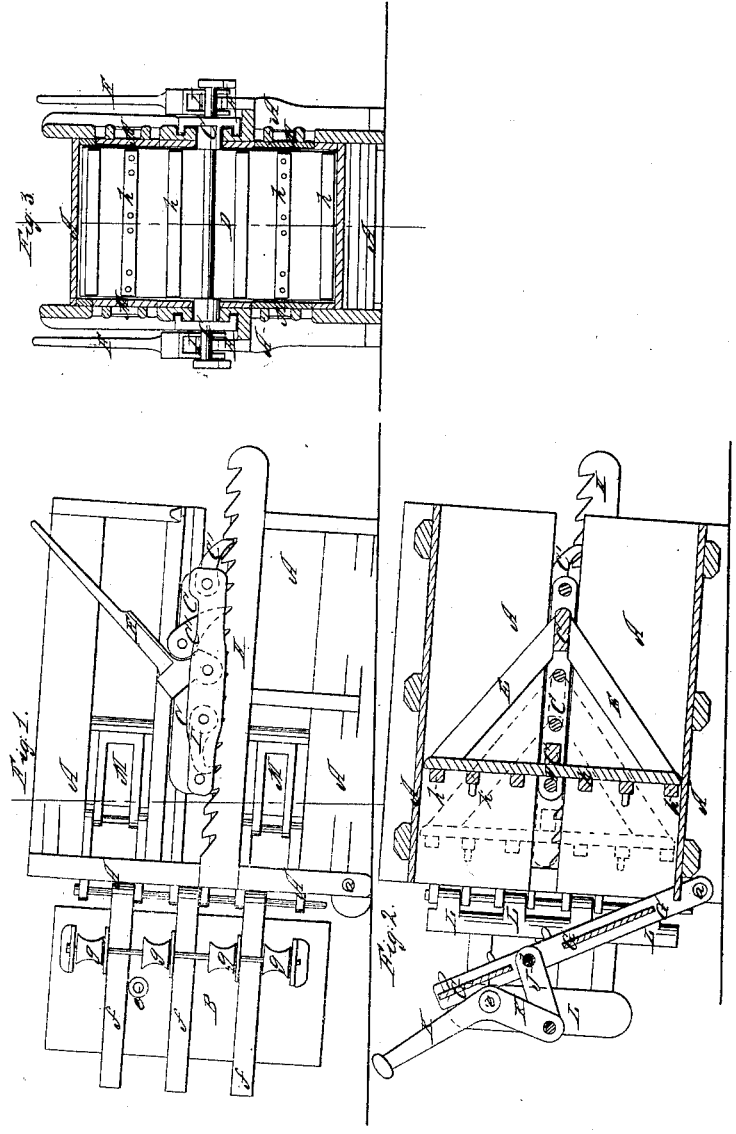
Witnesses:                                     Inventor:

UNITED STATES PATENT OFFICE.

WILLIAM McCORD, OF SING SING, NEW YORK.

IMPROVEMENT IN HAY-PRESSES.

Specification forming part of Letters Patent No. 26,917, dated January 24, 1860.

*To all whom it may concern:*

Be it known that I, WILLIAM MCCORD, of Sing Sing, in the county of Westchester and State of New York, have invented a new and Improved Hay and Cotton Press; and I do hereby declare that the following is a full, clear, and exact description thereof, reference being had to the accompanying drawings, forming a part of this specification, in which—

Figure 1 represents a side elevation of my improved hay and cotton press, with the head of the same thrown open for the purpose of packing the hay or cotton previous to compressing it into bales. Fig. 2 is a longitudinal vertial section taken through Fig. 1, showing the follower in two positions. Fig. 3 is a vertical transverse section taken through Fig. 1, as indicated by the red line marked thereon.

The object of my invention is to pack the hay or cotton into the head of the press during the operation of filling the same for bales previously to compressing, the advantage of which is to enable the operator to pack the mass evenly and regularly, so that when the mass has been pressed and bound the bale will be of the same density throughout, and the fibers, should it be cotton, will not be injured, as in the present mode of packing and compressing the bale with followers. With the machine to be described the hay or cotton is packed thoroughly against the follower before the operation of pressing takes place.

It further has for its object a more compact and efficient means for operating the followers, one follower only being used, and when the contained mass is sufficiently compressed it is to be secured with tie-yarn or bale-bands before it is taken from the machine.

My invention and improvement in hay or cotton presses (the same machine without any change of its parts serves for either) consists in arranging in the front part or head of the press-box a hinged gate or packer, and operating the same by means of levers, so as to pack the hay or cotton into the box and against the follower, as the filling proceeds, the follower being alternately fixed and moved back by hand during this operation, as will be hereinafter fully described.

To enable those skilled in the art to fully understand my invention, I will proceed to describe its construction and operation.

In the drawings, A A represents a quadrangular press-box, which is securely braced and bolted together, so as to withstand any ordinary amount of lateral or vertical pressure outward. The ends of this box are both open; but the head B of the box is hinged to the side of the same, so that it may be used in the operation of compressing the mass by the follower.

The follower D is attached by suitable braces, E E, to a movable frame, C, which frame is operated by levers F (one on each side of the machine) through the medium of pawls C C and racks H H. I I are catch-pawls, which prevent recoil of the follower after it has been forced hard up. This device is attached to and moves with the frame and follower.

G is a swinging packer, which is hinged to the bottom of the press-box at $a$, as shown by Fig. 2. This packer is about the same size in superficial extent as the follower, so that it works within the box A.

J J are arms jointed to the swinging packer at $b$ at one end, and at the other end to a bent lever, K.

L is a swinging wing, which is hinged to the end of the press-box, and on the opposite side of the box to the swinging head or gate B. The object of this wing L is to serve, in connection with the head B, when both are open, for bearings for the fulcrum-rod $e$ of lever K during the operation of packing. The parts during this operation are in the position shown by Figs. 1 and 2, as described.

$f\ f\ f$ are transverse pieces, to which the planks of head B are secured. The ends of these three pieces project out from the edge of the plank, as shown by Fig. 1, and fit into recesses in the hinged portion of wing L when the head is closed for the pressing operation. Then by partially closing up the wing L this head is securely locked and held in its place. On the outside of the head B are spools $g\ g\ g\ g$, upon which is wound the tie-yarn for bundling hay, and from these spools the tie-yarn is carried through doors M in the side of press-box A, Figs. 1 and 2, and brought forward and fastened temporarily to the head again. Pieces of tie-yarn, with loops on their ends, are then laid upon the pieces $h\ h\ h$, behind the bale-strips running across the follower D, and the packing proceeds by putting in the hay and forcing it up against the follower D, which is held fast by the pawls C C, which engage with racks H H, while the packer G is in operation. When a quantity has been thus packed, another quantity is placed in and the follower moved back a little, the packer is then forced up by the lever K, as at first, and the loose hay is in this manner thoroughly and evenly packed against the follower until the desired quantity to form a bale has been put into the box and packed, as aforesaid. The head B is now closed by removing the packer G out of the way, and then locked by the wing L, as described. The pressing is now effected by moving the levers simultaneously and forcing the follower forward, the catch-pawls preceding the levers F drop down over each tooth in the rack and prevent the follower from recoiling. When the contained mass is sufficiently packed, the doors on the opposite side to those lettered M are opened, and the ends of the tie-yarn are passed through the loops of the cross-yarns, or those which lie on the follower, and fastened. The bale is then ready to be removed from the box, and this may be done by opening the head B and forcing up the follower. To return the follower back for another bundle it is only necessary to raise the pawls C C and I I, when the follower, with the mechanism for operating it, may be drawn back.

I claim—

The packing-head G, hinged to the press-box, and operated by lever K, in combination with follower D, when the same are all arranged so as to operate substantially in the manner, for the purposes and upon the principles set forth.

WM. McCORD.

Witnesses:
 B. GIROUNE,
 WM. THOMPSON